March 25, 1924.

W. F. MELLEN

COUPLING

Filed Jan. 13, 1923

William F. Mellen INVENTOR.

BY Ramsay Hoguet his ATTORNEY.

Patented Mar. 25, 1924.

1,488,266

UNITED STATES PATENT OFFICE.

WILLIAM F. MELLEN, OF CRANFORD, NEW JERSEY, ASSIGNOR TO RUBBER INSULATED METALS CORPORATION, OF NEW YORK, N. Y., A CORPORATION OF DELAWARE.

COUPLING.

Application filed January 13, 1923. Serial No. 612,478.

*To all whom it may concern:*

Be it known that I, WILLIAM F. MELLEN, a citizen of the United States, and a resident of the town of Cranford, in the county of Union and State of New Jersey, have invented an Improvement in Couplings, of which the following is a specification.

My invention relates to a coupling adapted to join a driving and a driven shaft and is particularly adapted to situations in which considerable lack of alignment of the driving and driven shafts may be expected, or in which relatively great variations or sudden changes in load may occur, as for instance in the case of crushing machinery, elevators, or the like.

My invention aims to provide a coupling which will have a maximum degree of flexibility and at the same time be enabled to withstand sudden changes in load. To this end my coupling is constructed in such a manner that the load is cushioned by a resilient member such as rubber and in certain instances a relatively rigid mechanical connection is established between the cooperating members of the coupling, which connection may act in conjunction with the rubber cushion.

Figure 1:
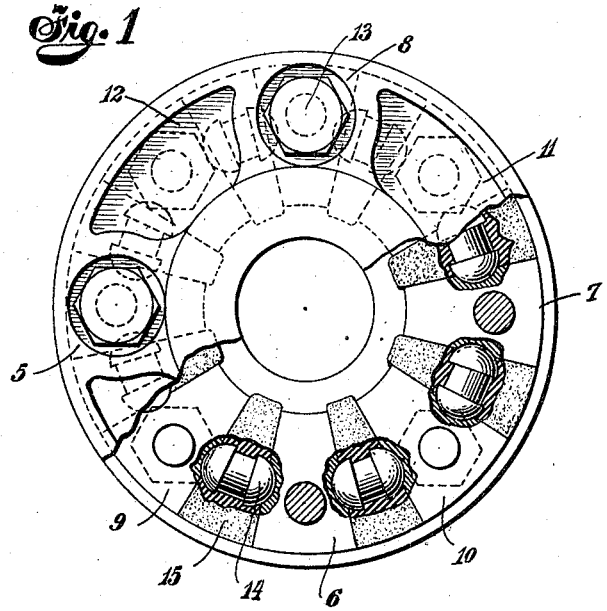
Figure 2:
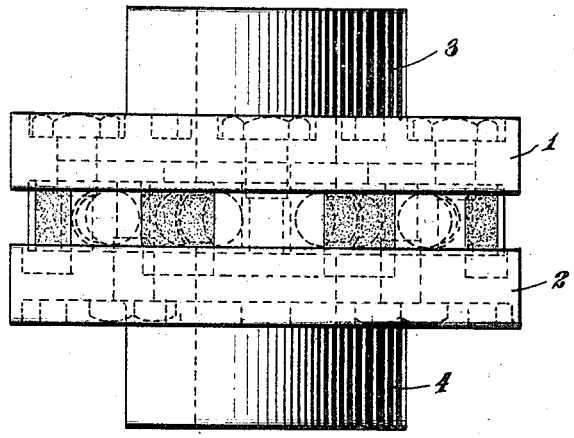

I have shown in Fig. 1 an end view, partially in section of my improved coupling, and in Figure 2, a side view thereof.

Referring to the drawings, my coupling comprises a pair of oppositely disposed members, which may be in the form of circular members having flanges 1 and 2 and bosses 3 and 4; the shafts being attached to the bosses in any convenient manner. Pivotally mounted upon the flange 1 are a plurality of teeth 5, 6, 7 and 8, and pivotally mounted upon the flange 2 are a plurality of teeth 9, 10, 11 and 12. These teeth may be conveniently mounted on studs 13 passing through the flanges and having their heads countersunk therein. The arrangement is such that when the coupling is assembled the teeth are alternately attached to opposite flanges. Between each tooth and its cooperating tooth on the opposite flange is a push pin 14 which is preferably formed with spherical ends, as shown in the drawings, which spherical ends engage spherical depressions in the opposed faces of the cooperating teeth. These depressions, as will be seen from the drawing, are located nearer to the axis of rotation than the pivotal points of the teeth and their distance from the axis of rotation is determined by the load at which it is desired to bring them into play, as will be evident from the following description.

Separating the teeth from one another and preferably completely enclosing the push pins are septa of rubber 15, which are preferably held in place by being vulcanized to the metal of the teeth in the manner familiar to the art. These septa of rubber act not only to assist in holding the push pins in position but also cushion the shocks incident to changes in the load and transmit a portion of the driving force. The septa are preferably limited by the opposing faces of the cooperating teeth of the two members of the coupling, and do not extend axially beyond these faces to a substantial degree. Angular movement of the shafts with respect to one another is thus not impeded by the presence of a rubber cushion between the end tooth and the face of the flange of the opposite member and a considerable degree of angular movement of the shaft is thus freely permitted, the rubber septa being at such times in shear, and the push pins, by reason of their universal connection with the teeth, being capable of easily following the movement of the teeth.

In the operation of my improved coupling it will be seen that when a load is applied to a driven shaft the teeth tend to turn about their pivots and the rubber septa are thus put into compression. The push pins also tend to transmit a portion of the load but the extent of their participation in the drive, and the time at which they come into effective action, is determined by their distance from the axis of rotation. It will thus be evident that I have combined in my improved coupling both positive and impositive driving means, and that the positive driving means, i. e., the push pins, are cushioned by the impositive driving means, i. e., the rubber septa to a greater or less extent, depending upon the variation in load.

My improved coupling offers many advantages from the point of view of manufacture. In assembling the coupling both sets of teeth and the push pins are assembled in their proper relative positions; the rubber septa are inserted in a plastic and uncured condition, and this assembly is then enclosed in a suitable mould and cured at a proper temperature, during which time the bonding of the rubber and metal takes place. The metal and rubber ring thus formed is then bolted to the opposing flanged members, the bolt holes of the teeth having been properly located by means of a jig or otherwise. This procedure enables me to use the same flanges for a number of different ring members suited to different characters of load and enables rapid repairs to be made should the same become necessary.

While I have only described one form of my invention, it will be understood that many variations may be made without departing from its spirit, and I therefore do not intend to confine myself to the precise details shown and described.

What I claim is:

1. A coupling comprising a pair of oppositely disposed members adapted to be carried by the shafts to be coupled, a pivotally mounted tooth on each of said members, a push pin extending between the teeth and a rubber septum interposed therebetween.

2. A coupling comprising a pair of oppositely disposed members adapted to be carried by the shafts to be coupled, a pivotally mounted tooth on each of said members, said teeth being provided with depressions in their opposing faces and a push pin seated at each end in one of said depressions.

3. A coupling comprising a pair of oppositely disposed members adapted to be carried by the shafts to be coupled, a pivotally mounted tooth on each of said members, a push pin extending between the teeth and contacting therewith at a point nearer the axis of rotation than the pivotal points of the teeth.

4. A coupling comprising a pair of oppositely disposed members adapted to be carried by the shafts to be coupled, a pivotally mounted tooth on each of said members, said teeth being provided with depressions on their opposed faces nearer the axis of rotation than the pivotal points of the teeth, a push pin seated at each end in one of said depressions and a rubber septum enclosing the push pin.

5. A coupling comprising a pair of oppositely disposed members adapted to be carried by the shafts to be coupled, a pivotally mounted tooth on each of said members, a push pin adapted to transmit a thrust from one tooth to the other when a tooth is rotated about its pivotal point and a rubber septum interposed between the teeth and adapted to hold the push pin in position.

6. A coupling comprising a pair of oppositely disposed members adapted to be carried by the shafts to be coupled, a pivotally mounted tooth on each of said members, said teeth each being provided with a spherical socket in their opposed faces at a point nearer the axis of rotation, than the pivotal point of the teeth, a push pin having spherical ends seated in said depressions and a septum of rubber between the teeth enclosing the push pin and not extending substantially beyond the opposed faces of the teeth.

7. A coupling comprising a pair of flanged members each carrying a plurality of teeth pivoted adjacent their ends which are furthest removed from the axis of rotation, a plurality of push pins each extending from a tooth on one flange to a tooth on another and a plurality of rubber septa each between a tooth on one flange and a tooth on the other and each enclosing and supporting a push pin.

In testimony whereof, I have signed my name to this specification this 9th day of January, 1923.

WILLIAM F. MELLEN.